(12) United States Patent
Stach

(10) Patent No.: US 7,831,062 B2
(45) Date of Patent: Nov. 9, 2010

(54) ARRANGEMENT OF OBJECTS IN IMAGES OR GRAPHICS TO CONVEY A MACHINE-READABLE SIGNAL

(75) Inventor: John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 12/464,679

(22) Filed: May 12, 2009

(65) Prior Publication Data

US 2009/0220121 A1    Sep. 3, 2009

Related U.S. Application Data

(63) Continuation of application No. 12/017,636, filed on Jan. 22, 2008, now Pat. No. 7,532,741, which is a continuation of application No. 11/127,442, filed on May 11, 2005, now Pat. No. 7,321,667, which is a continuation of application No. 10/074,680, filed on Feb. 11, 2002, now abandoned.

(60) Provisional application No. 60/350,505, filed on Jan. 18, 2002.

(51) Int. Cl.
*H04K 1/00* (2006.01)
(52) U.S. Cl. ................................ 382/100
(58) Field of Classification Search .......... 382/100, 382/232; 380/51, 54; 713/176
See application file for complete search history.

(56) References Cited

U.S. PATENT DOCUMENTS

| | | | |
|---|---|---|---|
| 3,859,633 A | 1/1975 | Ho et al. | 340/146.3 E |
| 3,893,080 A | 7/1975 | Ho et al. | 340/146.3 E |
| 4,748,679 A | 5/1988 | Gold et al. | 382/61 |
| 4,876,617 A | 10/1989 | Best et al. | 360/60 |
| 5,010,405 A | 4/1991 | Schreiber et al. | 358/141 |
| 5,091,966 A | 2/1992 | Bloomberg et al. | 382/21 |
| 5,278,400 A | 1/1994 | Appel | 235/494 |
| 5,329,108 A | 7/1994 | Lamoure | 235/494 |
| 5,530,759 A | 6/1996 | Braudaway et al. | 380/54 |
| 5,568,570 A | 10/1996 | Rabbani | 382/238 |
| 5,581,800 A | 12/1996 | Fardeau et al. | 455/2 |
| 5,636,292 A | 6/1997 | Rhoads | 382/232 |
| 5,664,018 A | 9/1997 | Leighton | 380/54 |
| 5,710,834 A | 1/1998 | Rhoads | 382/232 |
| 5,721,788 A | 2/1998 | Powell et al. | 382/100 |
| 5,745,604 A | 4/1998 | Rhoads | 382/232 |
| 5,765,176 A | 6/1998 | Bloomberg | 707/514 |
| 5,809,160 A | 9/1998 | Powell et al. | 382/100 |
| 5,832,119 A | 11/1998 | Rhoads | 382/232 |
| 5,862,260 A | 1/1999 | Rhoads | 382/232 |
| 5,864,742 A * | 1/1999 | Gasper et al. | 399/366 |
| 5,905,800 A | 5/1999 | Moskowitz et al. | 380/28 |
| 5,930,377 A | 7/1999 | Powell et al. | 382/100 |
| 6,101,602 A | 8/2000 | Fridrich | 713/176 |
| 6,121,530 A | 9/2000 | Sonoda | 84/609 |
| 6,122,392 A | 9/2000 | Rhoads | 382/100 |
| 6,122,403 A | 9/2000 | Rhoads | 382/233 |
| 6,131,161 A | 10/2000 | Linnartz | 713/176 |
| 6,154,571 A | 11/2000 | Cox et al. | 382/250 |
| 6,181,802 B1 | 1/2001 | Todd | 382/100 |
| 6,185,683 B1 | 2/2001 | Ginter et al. | 713/176 |
| 6,198,832 B1 | 3/2001 | Maes et al. | 382/100 |
| 6,254,007 B1 | 7/2001 | Mowry, Jr. | 235/494 |
| 6,272,176 B1 | 8/2001 | Srinivasan | 375/240 |
| 6,278,385 B1 | 8/2001 | Kondo et al. | 341/50 |
| 6,286,100 B1 | 9/2001 | Morimoto et al. | 713/176 |
| 6,317,505 B1 | 11/2001 | Powell et al. | 382/100 |
| 6,334,187 B1 | 12/2001 | Kadono | 713/176 |
| 6,343,138 B1 | 1/2002 | Rhoads | 382/100 |
| 6,345,104 B1 | 2/2002 | Rhoads | 382/100 |
| 6,385,330 B1 | 5/2002 | Powell et al. | 382/100 |
| 6,415,040 B1 | 7/2002 | Linnartz et al. | 382/100 |
| 6,418,232 B1 | 7/2002 | Nakano et al. | 382/100 |
| 6,427,012 B1 | 7/2002 | Petrovic | 380/238 |
| 6,449,367 B2 | 9/2002 | Van Wie et al. | 380/232 |
| 6,449,377 B1 | 9/2002 | Rhoads | 382/100 |
| 6,459,803 B1 | 10/2002 | Powell et al. | 382/100 |
| 6,463,162 B1 | 10/2002 | Vora | 382/100 |
| 6,477,276 B1 | 11/2002 | Inoue et al. | 382/232 |

(Continued)

FOREIGN PATENT DOCUMENTS

DE    2943436 A1    7/1981

(Continued)

OTHER PUBLICATIONS

U.S. Appl. No. 12/493,983, filed Jun. 29, 2009, Rhoads et al.

(Continued)

*Primary Examiner*—Andrew W Johns

(57) ABSTRACT

The present invention provides methods and systems related to arranging objects (e.g., circles, dots and other shapes) in images and graphics to convey a machine-readable signal. One claim recites a method including: integrating a plurality of objects in an image or graphic, the objects being arranged in a pattern that is machine-readable by a programmed computer processor, the plurality of objects being integrated in the image or graphic so that the pattern is hidden in the image or graphic through cooperation with design elements of the image or graphic; and providing a visible structure for aiding in machine-reading of the pattern by the programmed computer processor. Of course, other combinations are provided and claimed as well.

39 Claims, 2 Drawing Sheets

U.S. PATENT DOCUMENTS

| | | | |
|---|---|---|---|
| 6,493,457 B1 | 12/2002 | Quackenbush et al. | 382/100 |
| 6,505,160 B1 | 1/2003 | Levy et al. | 704/270 |
| 6,563,936 B2 | 5/2003 | Brill et al. | 382/100 |
| 6,567,101 B1 | 5/2003 | Thomas | 345/649 |
| 6,614,914 B1 | 9/2003 | Rhoads et al. | 382/100 |
| 6,700,994 B2 | 3/2004 | Maes et al. | 382/100 |
| 6,744,906 B2 | 6/2004 | Rhoads et al. | 382/100 |
| 6,754,377 B2 | 6/2004 | Rhoads | 382/135 |
| 6,778,682 B2 | 8/2004 | Rhoads | 382/100 |
| 6,804,377 B2 | 10/2004 | Reed et al. | 382/100 |
| 6,856,977 B1 | 2/2005 | Adelsbach et al. | 705/57 |
| 6,871,789 B2 | 3/2005 | Hilton et al. | 235/494 |
| 6,912,295 B2 | 6/2005 | Reed et al. | 382/100 |
| 6,922,480 B2 | 7/2005 | Rhoads | 382/137 |
| 6,947,571 B1 | 9/2005 | Rhoads et al. | 382/100 |
| 6,959,100 B2 | 10/2005 | Rhoads | 382/100 |
| 6,968,337 B2 | 11/2005 | Wold | 707/100 |
| 7,062,070 B2 | 6/2006 | Powell et al. | 382/100 |
| 7,068,812 B2 | 6/2006 | Powell et al. | 382/100 |
| 7,162,052 B2 | 1/2007 | Brundage et al. | 382/100 |
| 7,162,146 B2 | 1/2007 | Cookson et al. | 386/94 |
| 7,239,734 B2 | 7/2007 | Alattar et al. | 382/135 |
| 7,240,849 B2 | 7/2007 | Floriach et al. | 235/494 |
| 7,286,684 B2 | 10/2007 | Rhoads et al. | 382/100 |
| 7,321,667 B2 | 1/2008 | Stach | 382/100 |
| 7,555,139 B2 | 6/2009 | Rhoads et al. | 382/100 |
| 7,720,249 B2 | 5/2010 | Rhoads | 382/100 |
| 7,724,920 B2 | 5/2010 | Rhoads | 382/100 |
| 2001/0049788 A1 | 12/2001 | Shur | 713/176 |
| 2001/0052076 A1 | 12/2001 | Kadono | 713/176 |
| 2002/0009209 A1 | 1/2002 | Inoue et al. | 382/100 |
| 2002/0016916 A1 | 2/2002 | Natarajan | 713/179 |
| 2002/0021808 A1 | 2/2002 | Iwamura | 380/210 |
| 2002/0051559 A1 | 5/2002 | Noda et al. | 382/100 |
| 2002/0054355 A1 | 5/2002 | Brunk | 358/3.28 |
| 2002/0054680 A1* | 5/2002 | Huang et al. | 380/54 |
| 2002/0106104 A1 | 8/2002 | Brunk et al. | 382/100 |
| 2002/0126869 A1 | 9/2002 | Wang et al. | 382/100 |
| 2002/0136429 A1 | 9/2002 | Stach et al. | 382/100 |
| 2002/0172394 A1 | 11/2002 | Venkatesan et al. | 382/100 |
| 2002/0186861 A1 | 12/2002 | Echizen et al. | 382/100 |
| 2002/0191811 A1 | 12/2002 | Kamijo | 382/100 |
| 2003/0021439 A1 | 1/2003 | Lubin et al. | 382/100 |
| 2003/0039376 A1 | 2/2003 | Stach | 382/104 |
| 2003/0053654 A1 | 3/2003 | Patterson et al. | 382/100 |
| 2003/0118208 A1 | 6/2003 | Epstein | 382/100 |
| 2004/0032972 A1 | 2/2004 | Stach et al. | 382/104 |
| 2005/0063562 A1 | 3/2005 | Brunk et al. | 382/100 |
| 2005/0105760 A1 | 5/2005 | Eggers et al. | 382/100 |
| 2007/0088953 A1 | 4/2007 | Hilton et al. | 713/176 |

FOREIGN PATENT DOCUMENTS

| | | | |
|---|---|---|---|
| EP | 0493091 A1 | 7/1992 | |
| EP | 0838050 B1 | 4/2000 | |
| EP | 0966837 B1 | 7/2002 | |
| EP | 1147495 B1 | 1/2003 | |
| WO | WO0173997 A1 | 10/2001 | |
| WO | WO0203328 A1 | 1/2002 | |
| WO | WO0219269 A2 | 3/2002 | |
| WO | WO2005/027056 A1 | 3/2005 | |

OTHER PUBLICATIONS

U.S. Appl. No. 60/082,228, filed Apr. 16, 1998, Rhoads.

U.S. Appl. No. 60/350,505, filed Jan. 18, 2002, Stach et al.

"Access Control and COpyright Protection for Images, WorkPackage 8: Watermarking," Jun. 30, 1995, 46 pages.

Bender et al., "Techniques for Data Hiding," Proc. SPIE, vol. 2420, Feb. 9, 1995, pp. 164-173.

Brassil et al., Electronic Marking and Identification Techniques to Discourage Document Copying, Proceedings of INFOCOM '94 Conference on Computer, IEEE Commun. Soc Conference, Jun. 12-16, 1994, pp. 1278-1287.

Brassil et al., "Hiding Information in Document Images," Nov. 1995, 7 pages.

Caldelli et al., "Geometric-Invariant Robust Watermarking Through Constellation Matching in the Frequency Domain," IEEE Proc. Int. Conf. on Image Processing, vol. 2, Sep. 2000, pp. 65-68.

Ding et al., "A Novel Digital Image Hiding Technology Based on Tangram and Conway's Game," IEEE Proc. Int. Conf. on Image Processing, vol. 1, Sep. 2000, pp. 601-604.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Maes et al., "Digital Watermarking by Geometric Warping," IEEE Proc. Int. Conf. on Image Processing, vol. 2, Oct. 1998, pp. 424-426.

Rongen et al., "Digital Image Watermarking by Salient Point Modification Practical Results," Proc. SPIE vol. 3657: Security and Watermarking of Multimedia Contents, Jan. 1999, pp. 273-282.

Aug. 28, 2007 Notice of Allowance; Aug. 7, 2007 Supplemental Amendment (Including applicant's Interview Summary); Aug. 3, 2007 Examiner's Interview Summary; Jul. 23, 2007 Amendment; Jul. 18, 2007 non-final Office Action; and Feb. 12, 2007 preliminary Amendment; all from assignee's U.S. Appl. No. 11/127,442 (now US Patent No. 7,321,667).

Jun. 20, 2005 Letter of Express Abandonment of the application; Mar. 22, 2005 Notice of Allowance; Nov. 1, 2004 Amendment with RCE; Jul. 30, 2004 Notice of Allowance (including Examiner's Interview Summary); all from U.S. Appl. No. 10/074,680 (published as US 2002-0136429 A1—now abandoned).

Apr. 29, 2005 Notice of Allowance; Apr. 18, 2005 Response; Jan. 13, 2005 non-final Office Action; all from assignee's U.S. Patent No. 6,959,100.

* cited by examiner

ARRANGEMENT OF OBJECTS IN IMAGES OR GRAPHICS TO CONVEY A MACHINE-READABLE SIGNAL

RELATED APPLICATION DATA

The present application is a continuation of U.S. patent application Ser. No. 12/017,636, filed Jan. 22, 2008 (U.S. Pat. No. 7,532,741), which is a continuation of U.S. patent application Ser. No. 11/127,442, filed May 11, 2005 (U.S. Pat. No. 7,321,667), which is a continuation of U.S. patent application Ser. No. 10/074,680, filed Feb. 11, 2002 (abandoned, published as US 2002-0136429 A1), which claims the benefit of U.S. Provisional Patent Application No. 60/350,505, filed Jan. 18, 2002, titled "Data Hiding Through Arrangement of Objects."

The present application is also related to U.S. patent application Ser. No. 09/127,502, filed Jul. 31, 1998 (now U.S. Pat. No. 6,345,104), which is a continuation-in-part of U.S. patent application Ser. No. 09/074,034, filed May 6, 1998 (now U.S. Pat. No. 6,449,377). The 09/127,502 application is also a continuation-in-part of U.S. patent application Ser. No. 08/967,693, filed Nov. 12, 1997 (now U.S. Pat. No. 6,122,392), which is a continuation of application Ser. No. 08/614,521, filed Mar. 15, 1996 (now U.S. Pat. No. 5,745,604), which is a continuation of application Ser. No. 08/215,289, filed Mar. 17, 1994 (now abandoned). The Ser. No. 09/127,502 application is also a continuation-in-part of application Ser. No. 08/649,419, filed May 16, 1996 (now U.S. Pat. No. 5,862,260). The Ser. No. 09/127,502 application also claims the benefit of U.S. Provisional application 60/082,228, filed Apr. 16, 1998.

The present application is also related to U.S. patent application Ser. No. 09/940,872, filed Aug. 27, 2001 (published as US 2003-0039376 A1).

Each of the above-mentioned patent documents is hereby incorporated herein by reference.

FIELD OF THE INVENTION

The present invention relates to steganography and data hiding.

BACKGROUND AND SUMMARY OF THE INVENTION

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending U.S. patent application Ser. No. 09/503,881 (now U.S. Pat. No. 6,614,914) and U.S. Pat. No. 6,122,403, which are each herein incorporated by reference.

In parent application Ser. No. 09/127,502 (now U.S. Pat. No. 6,345,104) we disclose the following: Many security documents are still designed largely by hand. A designer works at a drafting table or computer workstation, and spends many hours laying-out minute (e.g. 5 mm×5 mm) excerpts of the design. To aid integration of watermark and/or calibration pattern data in this process, an accessory layout grid can be provided, identifying the watermark "bias" (e.g. −3 to +3) that is to be included in each 250 micron cell of the security document. If the accessory grid indicates that the luminance should be slightly increased in a cell (e.g. 1%), the designer can take this bias in mind when defining the composition of the cell and include a touch less ink than might otherwise be included. Similarly, if the accessory grid indicates that the luminance should be somewhat strongly increased in a cell (e.g. 5%), the designer can again bear this in mind and try to include more ink than might otherwise be included. Due to the substantial redundancy of most watermark encoding techniques, strict compliance by the designer to these guidelines is not required. Even loose compliance can result in artwork that requires little, if any, further modification to reliably convey watermark and/or calibration information.

Such "designing-in" of embedded information in security documents is facilitated by the number of arbitrary design choices made by security document designers. A few examples from U.S. banknotes include the curls in the presidents' hair, the drape of clothing, the clouds in the skies, the shrubbery in the landscaping, the bricks in the pyramid, the fill patterns in the lettering, and the great number of arbitrary guilloche patterns and other fanciful designs, etc. All include curves, folds, wrinkles, shadow effects, etc., about which the designer has wide discretion in selecting local luminance, etc. Instead of making such choices arbitrarily, the designer can make these choices deliberately so as to serve an informational—as well as an aesthetic—function.

To further aid the security document designer, data defining several different information-carrying patterns (both watermark and/or calibration pattern) can be stored on mass storage of a computer a workstation and serve as a library of design elements for future designs. The same user-interface techniques that are employed to pick colors in image-editing software (e.g. Adobe Photoshop) and fill textures in presentation programs (e.g. Microsoft PowerPoint) can PowerPoint) can similarly be used to present a palette of information patterns to a security document designer. Clicking on a visual representation of the desired pattern makes the pattern available for inclusion in a security document being designed (e.g. filling a desired area).

In the embodiment earlier-described, the calibration pattern is printed as a visible artistic element of the security document. However, the same calibration effect can be provided subliminally if desired. That is, instead of generating artwork mimicking the gray-scale pattern of the reference calibration block, the reference calibration block can itself be encoded into the security document as small changes in local luminance. In many such embodiments, the bias to localized document luminance due to the calibration pattern is simply added to the bias due to the watermark data, and encoded like the watermark data (e.g. as localized changes to the width or position of component line-art lines, as inserted ink droplets, etc.).

The present invention continues these inventive ideas. According to one aspect of the present invention, message objects are included in an image. The message objects preferably have characteristics that distinguish them from image background or other image objects. Some such distinguishing characteristics many include, color or gray-scale values, luminance values, and a contrast in comparison to other objects or to a background. The distinguishing characteristics can be subtle and need not be perceptible by a human viewer. For example, the message object may be slightly lighter than the image background or other image objects. Or the message objects may be darker than its background.

Message objects are arranged within the image to convey (or hide) information, such as a steganographic message or signal. The message is typically indistinguishable by a human viewer. However, computer software can analyze the arrangement to determine the hidden information. In one embodiment, a digital watermark signal is reduced to a set of spatial positions. The set of spatial positions sufficiently conveys the digital watermark signal. Message objects are positioned according to the set of spatial points. Non-message objects are combined with the message objects with the message objects to form an image or design. The message objects include distinguishable characteristics, e.g., via color, contrast, gray-scale level or luminance, in comparison to the non-message objects. The digital watermark signal is detected by distinguishing the message objects from the non-message objects (e.g., via color or contrast differences) and analyzing the relative placement of the message objects within the image or design.

Additional features and advantages of the present invention will become even more apparent with reference to the following detailed description and accompanying drawings.

DETAILED DESCRIPTION

Figure 1:
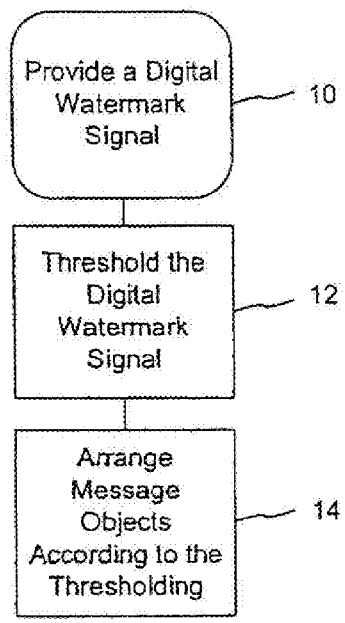
FIG. 1 is a flow diagram illustrating an image construction method according to one aspect of the present invention.

We have found that the arrangement of objects within an image can be used to convey information—which is otherwise imperceptible to a human viewer. We arrange so-called "message objects" to convey or represent a steganographic signal (e.g., a digital watermark). We define a message object broadly herein as including an information carrier, an image object, a shape, an object or collection of objects, a pixel or group of pixels, a contrast or color/gray-scale area, etc. A set of message objects is arranged within an image or area to form a steganographic message. A few examples are provided below.

Consider a drawing illustrating a Dalmatian puppy. The puppy has a white coat complimented with black spots. An artist (or digital editor) can arrange the spots—an example of a message object—so as to convey a hidden or steganographic message. More practical, however, is to align the spots according to a predetermined steganographic signal and then sculpt or design the puppy around the aligned spots.

Now consider an image or picture depicting hundreds of marbles strewn across a surface. Certain of the marbles have an offsetting color (or luminance, gray-scale level, contrast, etc.) when compared to the surface or to other marbles. We call these offset color marbles our "message marbles." The message marbles are arranged to represent (or to form) a steganographic signal. More practical, perhaps, is to initially arrange the message marbles according to a predetermined signal (e.g., a digital watermark signal, an orientation signal or various combinations of both) and then "fill-in" non-message marbles to complete the image.

Another example is particularly appealing to our astronomy friends. Consider an image or graphic depicting a nighttime sky. The sky is populated with "message stars." The message stars are arranged in the nighttime sky in a predetermined manner according to a steganographic signal. The sky is further populated with non-message stars. The message stars are preferably distinguishable from the non-message stars. The distinguishing characteristics need not be visibly perceptible, and may be based on subtle differences, e.g., as measured in luminance, color levels, brightness, contrast, etc.

A steganographic decoder, analyzing a digital version (e.g., an optically captured image) of the Dalmatian puppy, marble image or populated nighttime sky, decodes the steganographic message.

While the above signal-conveying techniques rely on the arrangement of message objects in a spatial domain (e.g., in an image), message formation or detection can be based in either a spatial or transform (e.g., Fourier or frequency) domain. For example, the arrangement of the message objects in the spatial domain may have significance in a frequency domain (e.g., may correspond to a pattern of peaks, etc.). Message detection can be accordingly facilitated, e.g., as discussed in Assignee's U.S. patent application Ser. Nos. 09/940,872 (published as US 2003-0039376 A1) and 09/503,881 (now U.S. Pat. No. 6,614,914), each of which is herein incorporated by reference. The incorporated by reference patent documents detail many techniques for signal hiding and message detection.

(Applicant notes that since the Fourier transform is a linear operation, adjustments to pixels in a region may be made in the frequency or spatial domain. For example, a digital watermark embedder can adjust the frequency domain representation of the host signal according to the watermark definition to form a frequency domain representation of the watermarked signal region, and then take the inverse Fourier transform of the watermarked regions to produce the watermarked signal in the spatial domain. Alternatively, the embedder can compute a difference signal to effect the desired changes to the region in the frequency domain, and then compute the inverse transform of the difference signal into the spatial domain, where corresponding pixels of the difference signal and host signal region are summed. Either way, the result is a watermarked signal in the original domain of the host signal).

Steganographic Image Construction

Figure 2:
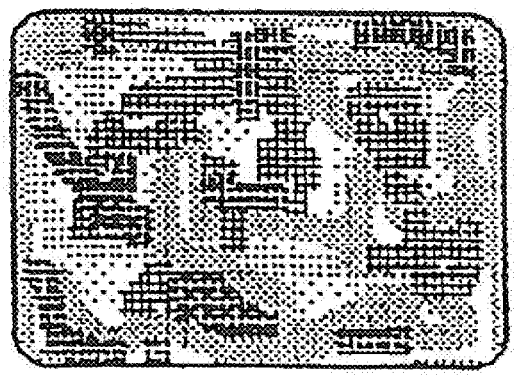
FIG. 2 illustrates a digital watermark signal.

We now describe our preferred image construction with reference to FIGS. 1-4. FIG. 1 illustrates a flow diagram depicting method steps for a first embodiment of the present invention. A digital watermark signal is provided in step 10. The watermark signal preferably includes a message component, e.g., a payload or identifier, and/or an orientation signal. An orientation signal is helpful to resolve image distortion such as scale and rotation. FIG. 2 illustrates an example of a watermark signal shown in a spatial domain. (We note that the FIG. 2 representation is exaggerated to help simplify the discussion). Although not required, the digital watermark signal is preferably a pure (or "raw") signal in that it does not include image data.

Thresholding is applied to the FIG. 2 watermark signal (step 12). Thresholding preferable identifies (or reduces the watermark signal to) a set of relevant points. The relevant points may correspond to or represent a wide range of features, such as signal or frequency peak levels, magnitude peaks, watermark message components, watermark orientation references, spatial domain signal characteristics, etc. Regardless of the relevant features used to determine a relevant point, the set of relevant points is preferably sufficient to represent (or convey) the watermark signal. (We use the term "thresholding" generally herein to include a process to identify a set and location of spatial points for placement of message objects. Alternatively, the thresholding may identify relevant frequency domain points, which can be mapped or transformed into a spatial domain representation.) The thresholding procedure can also be adjusted to provide a more or less robust watermark signal. For example, the spacing of relevant points can be increased, but at a cost of robustness.

While the term "thresholding" is used as an illustrative technique, the present invention is not so limited. Indeed there are other ways to refine a watermark signal into a set or map of relevant points. For example, a frequency analysis can be used to identify significant frequency characteristics (e.g., peaks). These characteristics can be mapped to the spatial domain to identify a placement point (e.g., a spatial location). Or, as in another implementation, the digital watermark signal is quantitized, e.g., via a root mean square measurement. Of course other techniques can be used to reduce a watermark signal to a set of relevant spatial points sufficient to convey the signal.

Figure 3:
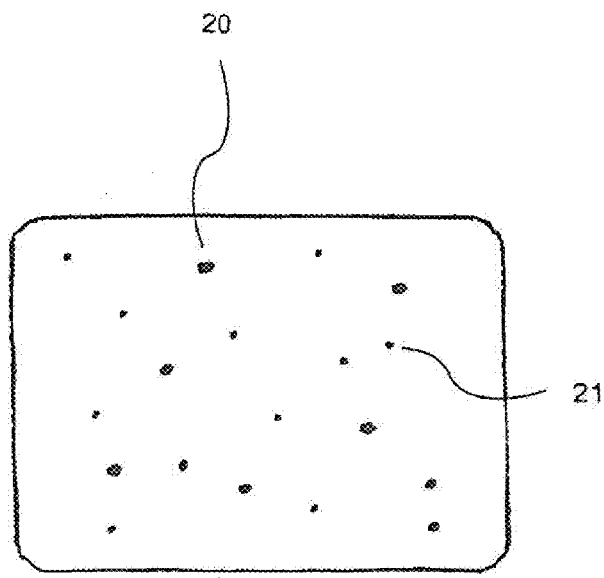
FIG. 3 illustrates a representation of the FIG. 2 watermark signal after thresholding.

The set of relevant points comprises a placement map as shown in FIG. 3. (It should be appreciated that there are many, many possible placement map patterns, including many more or less significant positions. FIG. 3 illustrates but one such possible placement map). The FIG. 3 placement map includes a plurality of spatial positions or points (e.g., 20 and 21). These points guide the placement of message objects.

In one alternative implementation, the placement map includes a relative contrast indicator. For example, a placement map point may include a relatively darker or larger point (20), indicating a need for a stronger contrast level (or color, gray-scale, etc.) of a message object, in comparison to a relatively lighter or smaller point (21). A higher contrast may signify a predetermined frequency domain characteristic, such as peak magnitude or frequency response, etc.

Returning to FIG. 1, message objects are arranged according to the placement mapping (step 14). For example, message marbles (or message stars, black Dalmatian spots, etc.) are placed on or over (or otherwise placed corresponding to) the placement map points. The message objects thus convey the steganographic signal. Other image objects can be placed in the image, e.g., to fill in or otherwise populate the image.

Alternative Steganographic Images

There are many alternative ways to implement our inventive steganographic techniques. Consider the following illustrative examples.

Off-the-shelf digital image editing tools (e.g., as provided by Adobe) can be used to place message objects in an image. The operator selects a message object, adjusts the object contrast (or color/gray-level, etc.) to sufficiently set the object apart from other image objects or the image background, and then places the objects according to a digital watermark placement map. Of map. Of course this placement process can be automated.

A farmer's field can be plowed or crops can be planted or cut to represent message objects, all arranged according to a steganographic placement map. An aerial image of the farmer's field then includes the steganographic message.

Different color tulips (or other flowers) can be planted according to a placement map. For example, groups of white tulips (e.g., message tulips) can be planted in an otherwise purple tulip field. An aerial image captures the field—including the steganographic message.

Captured images can be used in advertisements, e.g., when the steganographic message carries a link (e.g., a URL or an identifier used to obtain a link). Assignee's U.S. patent application Ser. No. 09/571,422, filed May 15, 2000 (U.S. Pat. No. 6,947,571), discloses many suitable linking techniques that are expressly contemplated as being combined with the present invention. This patent application is herein incorporated by reference.

Our techniques can even be advantageously employed in the photo-mosaic field. (Photo-mosaic processes are even further discussed, e.g., in U.S. Pat. Nos. 6,137,498 and 5,649,032, which are each incorporated herein by reference). As disclosed in U.S. Pat. No. 6,137,498, a mosaic image is formed from a database (or collection) of source images. Source images are analyzed, selected and organized to produce the mosaic image. A target image is divided into tile regions, each of which is compared with individual source image portions to determine the best available matching source image. Positioning respective best-matching source images at the respective tile regions forms the mosaic image.

An improvement to a photo-mosaic process is to arrange message source photos (e.g., representing message objects) according to a watermark placement map. Preferably, the message source photos are subtly distinguishable from other mosaic photos via a gray-scale value, a color value, contrast or luminance, etc. The message source photos form (or convey) a steganographic signal. In one implementation, the arrangement of message source photos is carried out via the "best available matching" discussed above with respect to the U.S. Pat. No. 6,137,498. In a first implementation, the process determines whether a selected best available photo is to be titled over a placement map position. If so, the photo characteristics (luminance, contrast, gray-scale, etc.) are subtly altered to create a message source photo. In a second implementation, the "best available matching" algorithm includes selection criteria, e.g., if selecting a photo for a placement map position, the algorithm selects a photo with sufficient distinguishing characteristics to qualify as a message object. The distinguishing characteristics can be measured in terms of its neighbors (e.g., a message photograph may include an overall different contrast, color or gray-scale level from its neighboring photographs) or in terms of non-message photographs. In a third implementation, message source photos are arranged according to a placement map, and then other source photos are used to fill in or complete the photo mosaic. In a variation of this third implementation, the other, non-message source photos are selected and arranged according to a best available matching technique.

Similar embedded designs can be made using coins, bills, umbrellas, coffee mugs, opened or closed blinds in an apartment building, shapes, snow flakes, groups of pixels, etc., etc.

Figure 4:
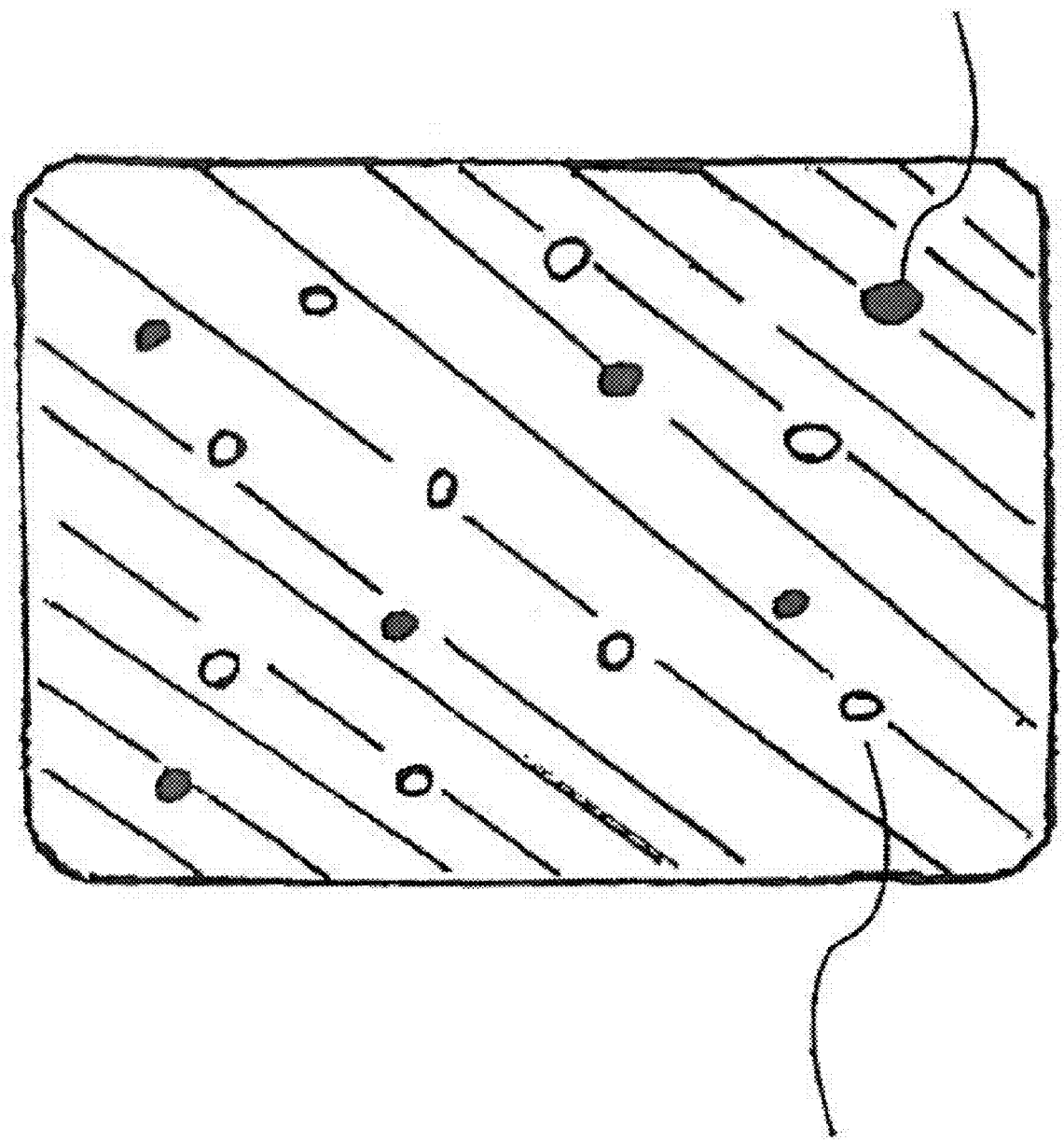
FIG. 4 illustrates a gray-scale image including message objects.

With reference to FIG. 4, message objects of different colors (or gray-levels, tones, contrasts, luminance, etc.) can be used in the same image. For example, the FIG. 4 image includes a gray background (shown by the diagonal hashes).

A message object can be distinguished from the background if it is either lighter 30 or darker 31 than the background. Or if the background is blue, message objects can be red or green, etc.

Message Detection

An image created according to our inventive techniques can be read using steganographic or digital watermarking decoding techniques, e.g., as described in assignee's 09/571, 422 (U.S. Pat. No. 6,947,571) and/or 09/503,881 (U.S. Pat. No. 6,614,914) applications. In one implementation, Digimarc MediaBridge watermark reading software, available from Digimarc Corporation headquartered in Tualatin, Oreg., is used to read an image including a corresponding MediaBridge digital watermark signal represented through our message object arranging techniques. Of course, other decoding techniques can be used, particularly when they correspond to the techniques used to generate the original watermark signal. (For example, when using a Digimarc MediaBridge reader, the watermark signal is preferably created using a MediaBridge signal generator or embedder). Most commonly, the reader identifies the message objects from the different levels of contrast (or color, gray-scale, luminance, etc.) between a message object and other objects or background.

CONCLUSION

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, applicants incorporate by reference, in their entireties, the disclosures of the above-cited patents and applications. The particular combinations of elements and features in the above-detailed embodiments are exemplary only; the interchanging and substitution of these teachings with other teachings in this application and the incorporated-by-reference patents/applications are expressly contemplated.

One application uses our inventive embedding techniques for "long-distance" or aerial digital watermark reading, e.g., for some of the traffic monitoring examples disclosed in Assignee's U.S. Provisional Patent Application No. 60/327,687, filed Oct. 5, 2001. (In one experiment we created a digitally watermarked image using our inventive object placement techniques disclosed herein. We then optically captured an image of the watermarked image with a digital camera augmented with a telescope. The watermarked image was about 100 feet away from the camera/telescope. The watermark was successfully detected).

Although not belabored herein, artisans will understand that the systems and methods described above can be implemented using a variety of hardware and software systems. Alternatively, dedicated hardware, or programmable logic circuits, can be employed for such operations.

The various section headings in this application are provided for the reader's convenience and provide no substantive limitations. The features found in one section may be readily combined with those features in another section.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method comprising:
utilizing a programmed electronic processor, providing a plurality of dots or circles arranged in a pattern on or in an image or graphic, the pattern conveying a machine-readable signal, in which the presence of the pattern is disguised to a human viewer of the image or graphic through provision of design elements associated with the image or graphic, and in which the presence of the pattern of the dots or circles would be apparent to the human viewer of the image or graphic absent the provision of the design elements; and
utilizing a programmed electronic processor, providing an orientation element, the orientation element provides orientation or registration clues for successful reading of the machine-readable signal.

2. The method of claim 1 in which the presence of the pattern is disguised to a human viewer of the image or graphic through color characteristics of the pattern relative to the design elements.

3. The method of claim 2 in which the color characteristics comprise color contrast.

4. A non-transitory computer readable memory comprising instructions stored therein, the instructions are for causing an electronic processor to perform the method of claim 3.

5. A non-transitory computer readable memory comprising instructions stored therein, the instructions are for causing an electronic processor to perform the method of claim 2.

6. A programmed computing device storing instructions in memory, said instructions are executable by said programmed computing device to perform the acts of claim 2.

7. A non-transitory computer readable memory comprising instructions stored therein, the instructions are for causing an electronic processor to perform the method of claim 1.

8. A programmed computing device storing instructions in memory, said instructions are executable by said programmed computing device to perform the acts of claim 1.

9. A method comprising:
integrating a plurality of objects in an image or graphic, the objects being arranged in a pattern that is machine-readable by a programmed computer processor, the plurality of objects being integrated in the image or graphic so that the pattern is hidden in the image or graphic through cooperation with design elements of the image or graphic; and
providing a visible structure for aiding in machine-reading of the pattern by the programmed computer processor.

10. The method of claim 9 in which the objects comprise dots or circles.

11. A non-transitory computer readable memory comprising instructions stored therein, the instructions are for causing a computer processor to perform the method of claim 10.

12. A programmed computing device storing instructions in memory, said instructions are executable by said programmed computing device to perform the acts of claim 10.

13. The method of claim 9 in which the cooperation comprises a relationship of color characteristics of the pattern relative to color characteristics of the design elements.

14. A non-transitory computer readable memory comprising instructions stored therein, the instructions are for causing a computer processor to perform the method of claim 13.

15. A programmed computing device storing instructions in memory, said instructions are executable by said programmed computing device to perform the acts of claim 13.

16. A non-transitory computer readable memory comprising instructions stored therein, the instructions are for causing a computer processor to perform the method of claim 9.

17. A programmed computing device storing instructions in memory, said instructions are executable by said programmed computing device to perform the acts of claim 9.

18. A method comprising:
providing a visible structure for association with an image or graphic, the visible structure aids machine-recognition of a pattern by a programmed computer processor;
integrating a plurality of objects in the image or graphic, the plurality of objects is arranged in the pattern for machine-recognition by the programmed computer processor, the plurality of objects is integrated in the image or graphic such that the pattern is concealed therein through association with design elements of the image or graphic.

19. A non-transitory computer readable memory comprising instructions stored therein, the instructions are for causing a computer processor to perform the method of claim 18.

20. A programmed computing device storing instructions in memory, said instructions are executable by said programmed computing device to perform the acts of claim 18.

21. A method comprising:
obtaining data representing: i) an image or graphic, and ii) an orientation element associated with the image or graphic, in which the image or graphic comprises a plurality of dots or circles arranged in a pattern on or in the image or graphic, the pattern conveying a machine-readable signal, in which the presence of the pattern is disguised to a human viewer of the image or graphic through provision of design elements associated with the image or graphic, and in which the presence of the pattern of the dots or circles would be apparent to the human viewer of the image or graphic absent the provision of the design elements, and in which the orientation element provides orientation or registration clues for successful reading of the machine-readable signal;
utilizing a programmed electronic processor, analyzing the data to read the machine-readable signal, in which said analyzing utilizes data representing the orientation element.

22. The method of claim 21 in which the presence of the pattern is disguised to a human viewer of the image or graphic through color characteristics of the pattern relative to the design elements.

23. The method of claim 22 in which the color characteristics comprise color contrast.

24. A non-transitory computer readable memory comprising instructions stored therein, the instructions are for causing an electronic processor to perform the method of claim 22.

25. A programmed computing device storing instructions in memory, said instructions are executable by said programmed computing device to perform the acts of claim 22.

26. A non-transitory computer readable memory comprising instructions stored therein, the instructions are for causing an electronic processor to perform the method of claim 21.

27. A programmed computing device storing instructions in memory, said instructions are executable by said programmed computing device to perform the acts of claim 21.

28. A method comprising:
obtaining data representing: i) an image or graphic, and ii) a visible structure associated with the image or graphic, in which a plurality of objects are integrated in the image or graphic, the objects being arranged in a pattern that is machine-readable by a programmed computer processor, the plurality of objects being integrated in the image or graphic so that the pattern is hidden in the image or graphic through cooperation with design elements of the image or graphic, and in which the visible structure is for aiding in machine-reading of the pattern by the programmed computer processor; and
utilizing a programmed computer processor, machine-reading the pattern, in which said machine-reading utilizes data representing the visual structure.

29. The method of claim 28 in which the objects comprise dots or circles.

30. A non-transitory computer readable memory comprising instructions stored therein, the instructions are for causing a computer processor to perform the method of claim 29.

31. A programmed computing device storing instructions in memory, said instructions are executable by said programmed computing device to perform the acts of claim 29.

32. The method of claim 28 in which the cooperation comprises a relationship of color characteristics of the pattern relative to color characteristics of the design elements.

33. A non-transitory computer readable memory comprising instructions stored therein, the instructions are for causing a computer processor to perform the method of claim 32.

34. A programmed computing device storing instructions in memory, said instructions are executable by said programmed computing device to perform the acts of claim 32.

35. A non-transitory computer readable memory comprising instructions stored therein, the instructions are for causing a computer processor to perform the method of claim 28.

36. A programmed computing device storing instructions in memory, said instructions are executable by said programmed computing device to perform the acts of claim 28.

37. A method comprising:
obtaining data representing: i) an image or graphic, and ii) a visible structure associated with the image or graphic, in which the visible structure aids machine- recognition of a pattern by a programmed computer processor, and in which the image or graphic comprises a plurality of objects integrated therein, the plurality of objects is arranged in the pattern for machine-recognition by the programmed computer processor, the plurality of objects is integrated in the image or graphic such that the pattern is concealed therein through association with design elements of the image or graphic; and
utilizing a programmed computer processor, machine-recognizing the pattern, in which said machine-recognitions utilizes data representing the visual structure.

38. A non-transitory computer readable memory comprising instructions stored therein, the instructions are for causing a computer processor to perform the method of claim 37.

39. A programmed computing device storing instructions in memory, said instructions are executable by said programmed computing device to perform the acts of claim 37.

* * * * *